(12) United States Patent
Fong et al.

(10) Patent No.: US 6,263,359 B1
(45) Date of Patent: Jul. 17, 2001

(54) COMPUTER RESOURCE PROPORTIONAL UTILIZATION AND RESPONSE TIME SCHEDULING

(75) Inventors: Liana Liyow Fong, Irvington; Mark Steven Squillante, Pound Ridge, both of NY (US); Roger Eldred Hough, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/862,044

(22) Filed: May 22, 1997

(51) Int. Cl.$^7$ ........................................... G06F 9/00
(52) U.S. Cl. ............................. 709/103; 709/100
(58) Field of Search ..................... 709/100, 102, 709/103, 104, 105, 106, 107, 108; 712/28

(56) References Cited

U.S. PATENT DOCUMENTS

| | | |
|---|---|---|
| 4,007,444 | 2/1977 | Anceau et al. . |
| 5,325,525 * | 6/1994 | Shan et al. .......................... 395/674 |
| 5,504,894 | 4/1996 | Ferguson et al. . |
| 5,537,542 | 7/1996 | Eilert et al. . |
| 5,838,968 * | 11/1998 | Culbert ................................ 395/674 |

FOREIGN PATENT DOCUMENTS

| | | |
|---|---|---|
| 0647903A1 | 4/1995 | (EP) . |
| 0725339A2 | 8/1996 | (EP) . |
| 08030471 | 2/1996 | (JP) . |

OTHER PUBLICATIONS

Fong et al., "Time–Function Scheduling: A General Approach To Controllable Resource Management", IBM Research Report RC 20155, Mar. 1995, XP002105419, p. 1–13.

IBM Research Report RC 20155, *Time–Function Scheduling: A General Approach To Controllable Resource Management,* Liana L. Fong and Mark S. Squillante, Mar. 1995, pp. 1–25.

*Lottery Scheduling: Flexible Proportional–Share Resource Management,* Authors Carl A. Waldspurger, William E. Weihl, MIT Laboratory for Computer Science, Cambridge, MA 02139, USENIX Association First Symposium on Operating Systems Design and Implementation (OSDI) pp. 1–11.

*Properties o delay–cost scheduling in time–sharing systems,* by P.A. Franaszek and R.D. Nelson, IBM J. Res. Develop. vol. 39, No. 3, May 1995, pp. 295–314.

*A Fair Share Scheduler,* J. Kay and P. Lauder, Communications of the ACM, Jan. 1988, vol. 31, No. 1, pp. 44–54.

\* cited by examiner

Primary Examiner—Majid A. Banankhah
(74) Attorney, Agent, or Firm—Jeffrey S. LaBaw

(57) ABSTRACT

A method of scheduling jobs to be executed by a resource in a computer system wherein the jobs are grouped in "classes." The job classes vying for the resource's attention are arranged in a hierarchy. Each job class has a time-function value that controls when the job class is selected by the resource if processing time becomes available. Within a particular level of the hierarchy, scheduling priorities are defined by one or more time-based functions, each of which may be constant or dynamically varying. When constant time-based functions are used, each job class has a schedule value that remains fixed with time. When dynamic time-based functions are used, job class "time-function values" are modified to alter the timing by which the job class(es) acquire the resource.

33 Claims, 7 Drawing Sheets

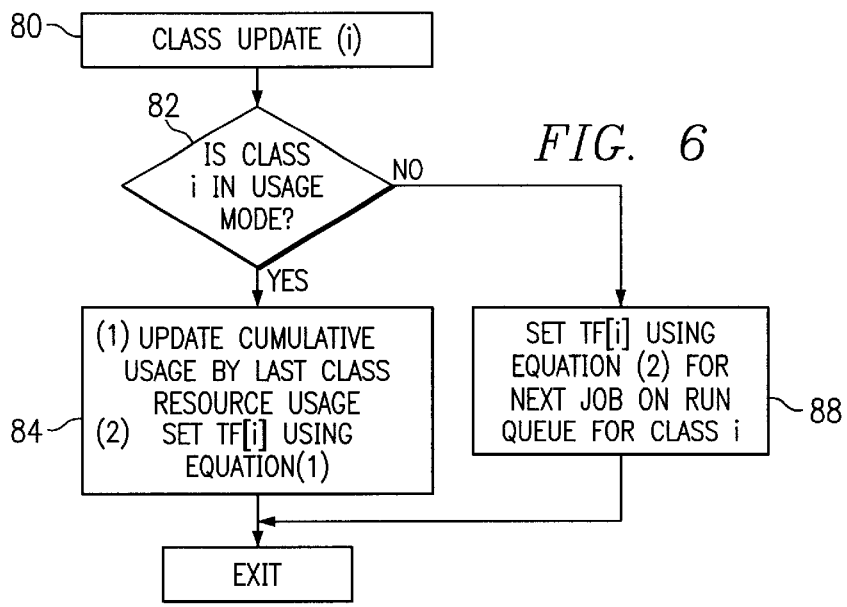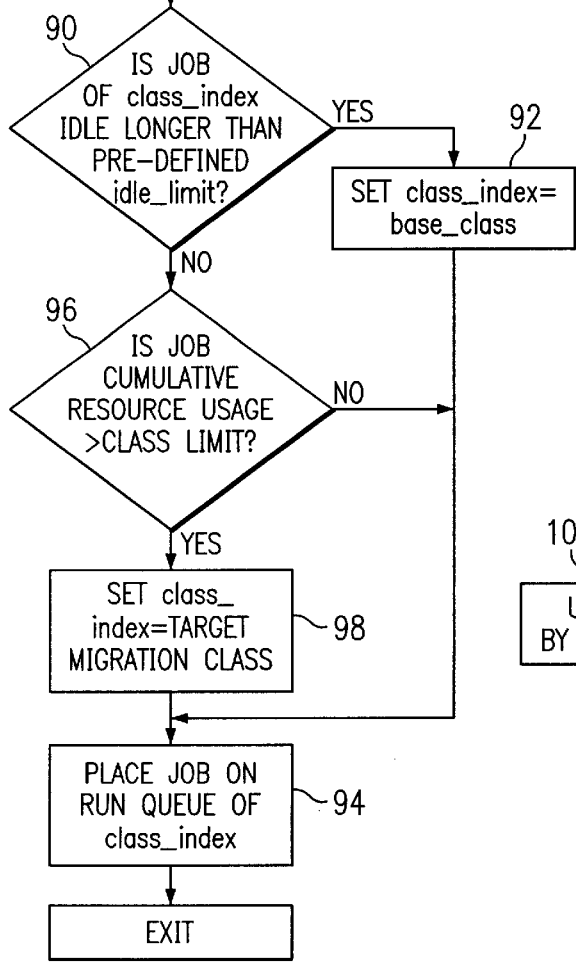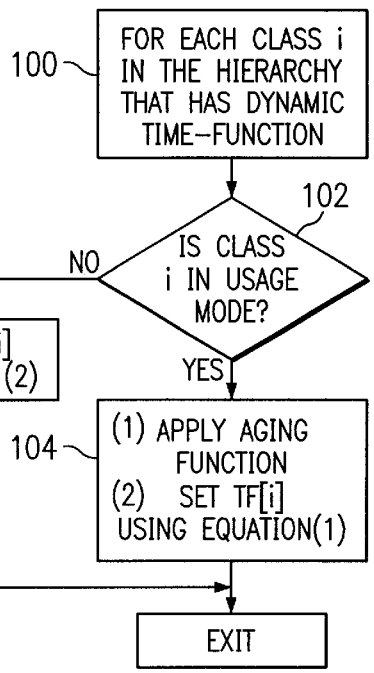

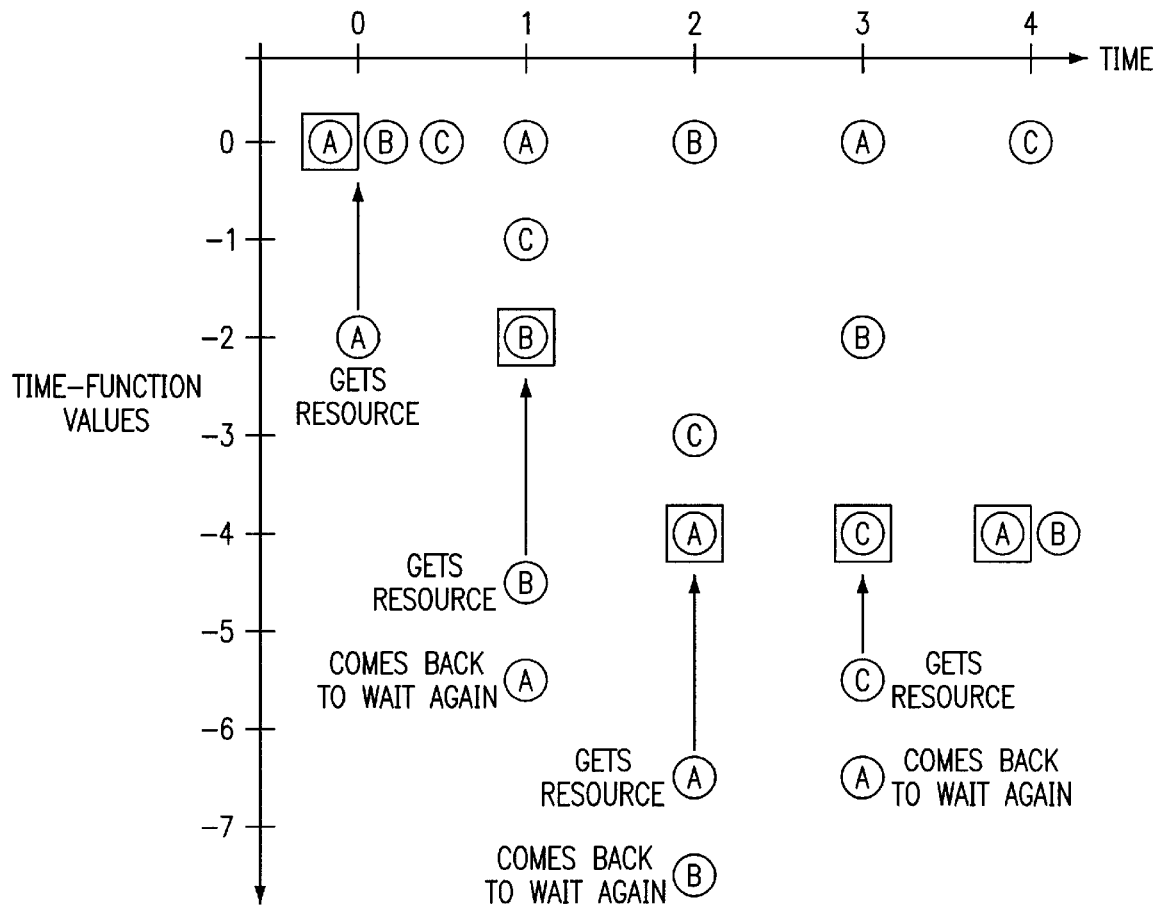

COMPUTER RESOURCE PROPORTIONAL UTILIZATION AND RESPONSE TIME SCHEDULING

BACKGROUND OF THE INVENTION

1. Technical Field

The present invention relates generally to scheduling resources in a computer system.

2. Description of the Related Art

The general goal of resource scheduling is to order the use of or access to the resource by tasks to meet a set of system-level and/or user-level objectives. For example, these objectives may include resource utilization objectives among different types (i.e. classes) of tasks, satisfying wait/response time objectives among different task classes, providing predictable (i.e. low variance) performance within and across task classes, allocating resources in a fair manner, and favoring tasks with short resource usage/holding time over tasks with long usage/holding time.

Many of these scheduling goals are often in conflict, thus making resource scheduling a complex design problem. Given this complexity, many scheduling algorithms have been designed to meet only a subset of the above objectives. While these policies are typically effective within their intended domains, they often have limited success, or they do not perform well at all in system environments with different requirements. Indeed, it is not unusual to find systems in which the scheduling and dispatching parameters must be manually adjusted in response to large changes in customer workload. This requirement gives rise to undesirable complexity and overhead. Thus, in addition to supporting multiple diverse scheduling objectives, a principal design challenge is to provide effective control over resource allocation to achieve the desired performance requirements for these simultaneous objectives.

The present invention addresses these problems.

SUMMARY OF THE INVENTION

It is a primary object of the invention to achieve proportional usage and response time performance objectives for the use of or the access to a resource within a unified and integrated scheduling mechanism of a computer system.

It is a further object of the invention to provide both "usage" and "response" mode scheduling of a computer resource, for example, a processor, wherein one mode is effected within the confines of a job class that has been constrained by the other mode.

It is still another object to allow for a system to dynamically adjust to changes in workload requirements for a resource without manual intervention.

It is another object of this invention to provide general, flexible and adaptive control over resource allocation to achieve diverse scheduling objectives and performance requirements.

It is another object of the invention to schedule a resource in a computer using a hierarchical scheme that supports the combination of "usage" and "response" mode objectives in a general and flexible manner, and to as many levels as desired.

Another object of the invention is to schedule a resource using general time-based functions that are driven by resource utilization and response time objectives, an adaptive feedback mechanism, and a notion of resource requester classes.

It is yet another object of the invention to schedule a computer resource for "classes" of requests, wherein a class consists of a group of requesters that have the same performance objective in relation to other classes of requesters in the system.

Still another object of the invention is to provide a job class scheduler that includes a migration mechanism associated with each class such that a given job that "taxes" the resource is migrated to a lower priority job class upon meeting a set of usage criteria.

A still further object is to use the unified and integrated methodology of the invention to address and solve known scheduling problems that have not been adequately solved by the prior art.

According to the invention, resource scheduling is performed for jobs in job classes within a unified framework according to "time-functions." Each job class has a "time-function" associated with it, the value of which dynamically controls when the job class is selected for scheduling as the resource becomes available. A time-function can be any function of "time" in the most general sense, such as a formula that determines the certain values returned by the function given values of a set of variables (or input parameters). The "time" parameter can be any measure of time with respect to the resource and other resources that are used to evaluate the per-class time-function value. In the preferred operation, the time-functions can be based on a general "usage" mode, in which the time parameter is any measure of the use of the resource or set of resources by the class, a general "response" mode, in which the time parameter is any measure of the waiting for the resource or set of resources by the class, or any combination of such modes. Any general order relation, or choice function, can then be used to determine which class should be selected based on the per-class time-function values. Example choice functions include the maximum and minimum operator, but in the preferred operation, the choice function is typically the operator that chooses the minimum value among the time-function values being considered. Once a job class is selected for scheduling, a job within that class is provided to the resource for execution.

According to another feature of the inventive scheduling framework, the job classes vying for a resource's attention are arranged in a general "hierarchy." The time-functions associated with the classes of each level of the hierarchy have the same "mode." However, each mode is preferably of equal and consistent viability. Moreover, the system administrator and/or user can arrange the job classes and the time-function modes at each level in any manner desired, and for as many levels as desired. For example, the top level of the hierarchy may consist of several job classes among which the resource is allocated to maintain a set of proportional utilization goals. Each of these classes has a usage-mode time-function associated with it that dynamically controls which class is selected for scheduling when the resource becomes available. At the next level of the hierarchy, each of the top-level classes may comprise several subclasses among which the resource is allocated to maintain a set of response time objectives. Each of these subclasses has a response-mode time-function associated with it that dynamically controls which subclass is selected for scheduling when its parent class is selected at the top level of the hierarchy. This hierarchical scheduling framework is completely general and can be recursively defined to as many levels as necessary/desired.

According to another feature of the invention, the collection of job classes at each level of the scheduling hierarchy can be partitioned into "groups" of job classes with the first group having absolute priority over all other groups, in the sense that job classes in other groups are not considered for access to the resource unless all classes in the first group are empty. The second job class group has absolute priority over all other groups except the first job class group, and a similar absolute priority ordering is defined for the remaining job class groups. The time-functions for the classes in each group have similar forms in the sense that they are either constant (i.e they do not vary with "time"), or they vary dynamically according to either "usage" or "response" mode. For example, a first job class group may comprise high-priority short system tasks, interactive work (wherein only a small amount of resource usage occurs between substantial idle periods), and jobs with real-time contraints that have absolute priority over other classes of work.

In one preferred embodiment, it is preferably intended to exploit the job class grouping primarily at the top level of the hierarchy at any level or combination of levels of the heirarchy. However, the present invention includes general use of job class groups together with the scheduling hierarchy, Several adaptive feedback mechanisms are preferably a feature of the inventive scheduling framework. One such technique involves adaptively adjusting the time-functions with changes in the resource utilization, mix of jobs or any other trigger or event. Another technique involves migrating jobs from one class to another in the hierarchy as usage of the resource, or set of resources, exceeds limits specified by a system administrator and/or a user, and then returning a job to its originating class if it becomes idle for a sufficiently long period of time, as pre-specified by the system administrator or user.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 6 is a flowchart illustrating a Class Update routine;

FIG. 7 is a flowchart illustrating a Job Enter/Return routine;

FIG. 8 is a flowchart illustrating a History Update routine; and

FIGS. 9A–9B are graphs of illustrative usage and response mode scheduling objectives showing how job classes are scheduled according to the present invention.

DETAILED DESCRIPTION OF THE PREFERRED EMBODIMENT

Figure 1:
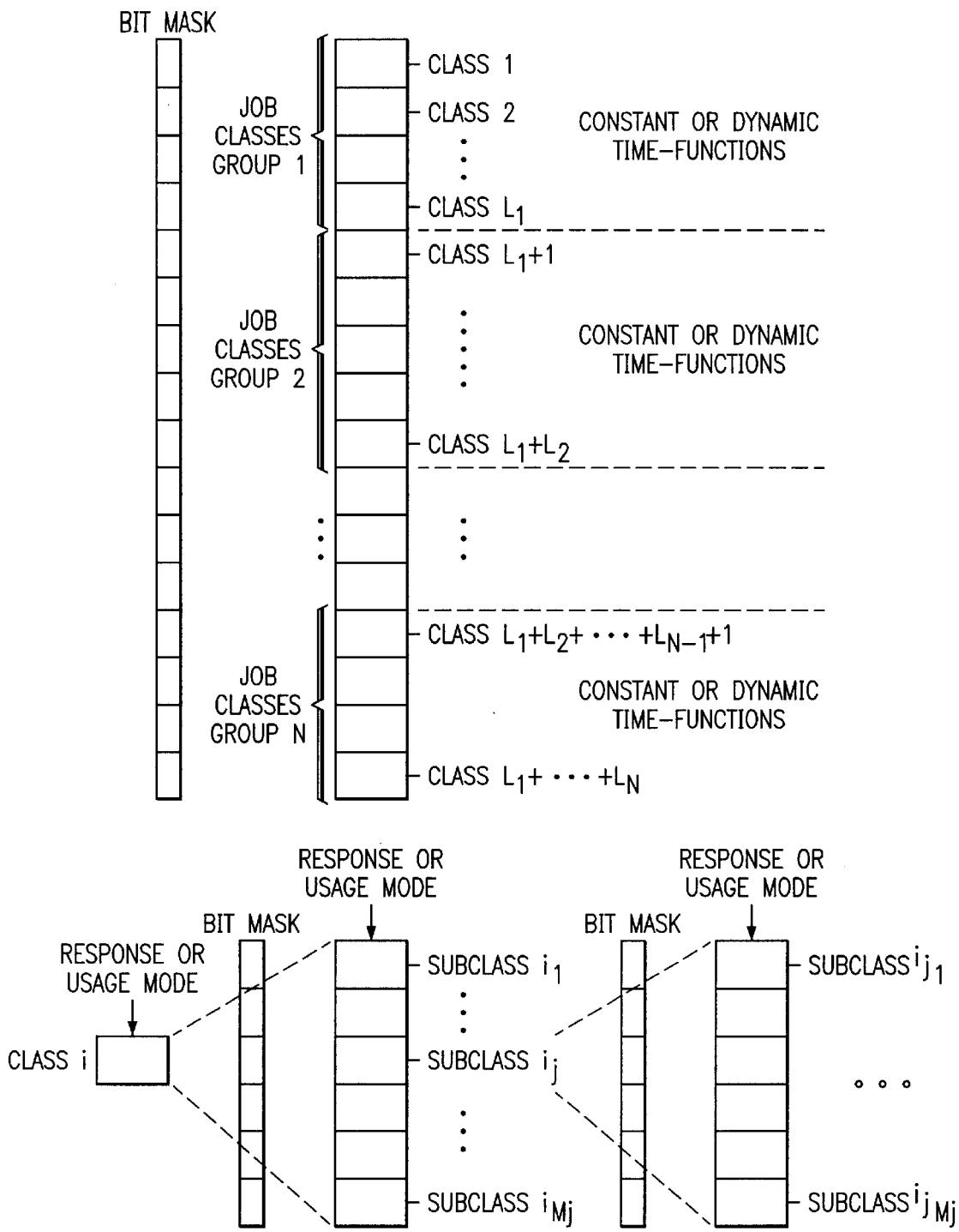
FIG. 1 is a representative hierarchy of job classes vying for access to a given resource in a computer or computer system.

According to the present invention, a "class" generally consists of a group of requesters that have the same performance objectives in relation to other classes of requesters in the system. In some instances, a class has only one requester. As used herein, a requester is often referred to as a "job," which is a work request vying for access to a resource in a given scheduling interval. In other words, in the context of a computer system, a job is analogous to a requester. Thus, each "job class" typically has an associated number of jobs desiring to access or "hold" the resource. Jobs may be assigned to a given class by the system, by the user, or a combination of both. Job classes, likewise, may be assigned by the system or user. As used herein, a "job class" may include one or more "jobs."

In a representative embodiment, the resource is a processor of a computer or computer system. The processor, as is well known, has a bounded number of computational cycles per unit time. Many different "classes" of jobs desire access to a processor. The present invention addresses the problem of scheduling the processor for various classes of requests in a way that maximizes its efficient use yet still meets a set of system-level and/or user-level resource consumption objectives.

According to the invention, consumption objectives are generally of two types: usage and response. Neither usage nor response mode is favored in the unified and integrated method of the invention that is described below and, as will be seen, this methodology has been designed to fully exploit the functional advantages of each mode, and any desired combination of these modes. The result is a very robust scheduling mechanism that facilitates extremely "fine" control over resource scheduling. In "usage" mode, the resource is proportionally allocated to job classes, or to a set of job classes (in a multi-level implementation), based on a proportional utilization (or "usage") objective defined for these classes (or subclasses). In the preferred embodiment of the invention, as will be seen, the proportional allocation is also based on an accumulated utilization (in a history-based-average sense) of the resource by each job class (or sub-grouping of job classes). Thus, in the case of a single level implementation involving a group of job classes, class 1 (for example) may receives 60% of the resource whereas class 2 receives 40% of the resource. In "response" mode, the resource is allocated to job classes, or to a set of job subclasses (in a multi-level implementation), to satisfy a proportional response time objective defined for these classes or to minimize a weighted sum of a function of the response times for these classes. Thus, for example, this objective may dictate that the mean response times of classes 1, 2 and 3 are to be maintained in the ratio 3:2:1 (or as close as is feasible). The particular proportional usage objective or the proportional (or weighted sum) response time objective(s) may be set by a user, by a system operator, or by some other means (manual or autonomous).

The present invention may be implemented in a computer or computer system, but this is not a requirement. As a representative example of how usage and responses can be used, the following is illustrative.

For usage mode, a computer system often has a primary core of work with some batch processing work that is to be performed around the primary core. The problem often encountered is that the batch work gets starved by the core work, and this is not desired. Therefore, you might want to ensure that the batch work gets at least 20% of the resource. Another example is where two departments share the computer and you want to proportionally allocate the resource among the two departments in a non-equal and controllable way. For response mode, it is often important in various computer systems (e.g., transaction processing systems) to control the mean and variance of response times among a set of job classes. In this case, it can be important to have the "priority" of a job in class "i" increase linearly with the time it spends waiting for the resource. The slope of this linear function depends upon the class and it is used to control the response times that each class gets (in an absolute sense, or relative to the other classes).

The use of time-functions unifies the support of diverse scheduling objectives within a single scheduling method. Which job class is selected for scheduling when the resource becomes available is determined dynamically by the time-function associated with each class at that epoch. Time-functions can be any function of "time" in the most general sense, where any measure of time with respect to the resource and other resources can be used to evaluate the time-function values (sometimes referred to as "TF value"). As used in the preferred embodiment, but not restricted to this use, "time" is measured in two general ways. For example, time is any measure of the use of the resource or set of resources by the class of requesters (i.e. jobs), in which case the time-function is said to be in "usage" mode, and/or time is any measure of the waiting for the resource or set of resources by the class of requesters, in which case the time-function is said to be in "response" mode. Without loss of generality, it is preferably assumed that the job class "i" is favored over job class j, for i<j, under equal conditions; i.e the time-function for class i yields a value greater than or equal to the time-function for class j when both are given the same set of input parameter values. Class i is referred to as a "higher class" than class j and, conversely, class j is a "lower class" than class i.

In the preferred embodiment, job classes are arranged in a hierarchy. FIG. 1 illustrates a general case of the hierarchical scheme 10. In this example, an entire group of job classes 1 through K is partitioned into "N" different groups (labeled 1-N), with each group having absolute priority over the job classes in the next group in the hierarchy. Thus, a job belonging to a class in group 2 can be executed only if there are no runable jobs from group 1 present in the system. Similarly, jobs in group 2 have absolute priority over those in group 3, and so on. In a representative system, job classes in the highest priority group, namely group 1, are used to do low level system work having high priority, such as operating system tasks. User level tasks (such as transaction processing) have relatively lower priority and therefore might be placed in group 2 (or perhaps lower). The lowest priority tasks, such as those that absorb excess cycle time (e.g., system back-up or other background processing) might be relegated to the lowest group N.

According to the invention, each group has one or more job classes associated therewith. Thus, as illustrated, group 1 has job classes 1 through $L_1$, group 2 has job classes $\{L_1+1\}$ through $\{L_1+L_2\}$ and so on through group N, which has job classes $\{L_1+L_2+\ldots L_{N-1}+1\}$ through $\{L_1+\ldots L_N\}$.

Moreover, as further illustrated in FIG. 1, a particular job class may be recursively defined into subclasses to as many levels as desired. Thus, job class i (whether response or usage mode is selected) may have associated therewith subclasses $i_1$ through $i_{Mi}$, and a particular subclass $i_j$ may likewise have associated therewith (whether response or usage mode is selected) a still further set of subclasses, $^i j_1$ through $^i j_{Mj}$, and so on. Thus, it is a feature of the present invention to provide for each class entry to be recursively defined. This provides a significant advantage in allowing much "finer" degree of scheduling control to meet a greater variety of user/system performance objectives.

FIG. 1 also illustrates another advantageous feature of the invention. In particular, the time-functions associated with the job classes in each group in the hierarchy may be either "constant" or "dynamic". Thus, within each group, the order in which job classes gain access to the resource is defined by time-based functions, each of which may be constant or dynamically varying according to some measure of time. When constant time-based functions are used, each job class has a time-function value that remains fixed with time. When dynamically varying time-based functions are used, the time-function value of a job class generally varies with respect to some measure of time. The advantages of this approach are described in detail below.

Further, associated with each set of classes or subclasses or sub-subclasses, etc. (as the case may be) is a bit mask 12. Each mask includes a bit (assigned a 0 or 1 value) associated with a particular class, subclass or sub-subclass, etc. (as the case may be). The bit provides an indication of whether the respective class, subclass or sub-subclass, etc., is empty and thus may be ignored during processing. This optimizes several of the scheduler routines as will be seen below. As an alternative to a bit mask, an array of pointers may be used.

Although not illustrated in detail in FIG. 1, each job within a particular job class is also assigned a job queue, which maintains a set of jobs from the corresponding class that are waiting to acquire the resource. The queue may be in any convenient database construct, such as a linked list.

Figure 2:
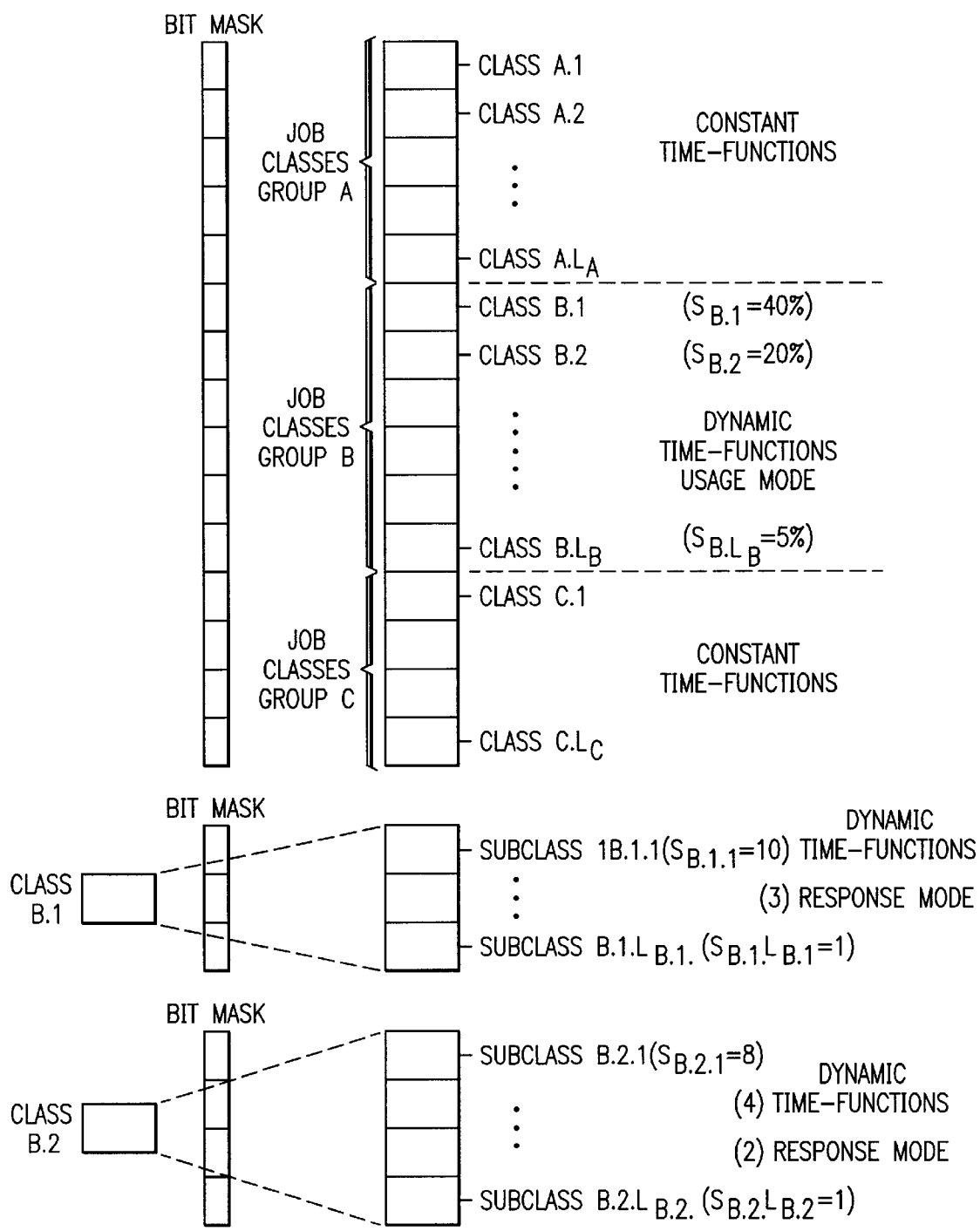
FIG. 2 is an exemplary hierarchy wherein proportional usage and response time allocations are supplied for a pair of subgroups that include dynamically varying time-based functions according to the present invention.

The hierarchy of groups, classes and subclasses presented here represents a very powerful framework to organize jobs such that jobs are scheduled to have access to resources to meet their performance objectives. Job classifications, their performance objectives, and thus the appropriate job class hierarchy, are set by users or system administrators who have the authorities and responsibilities to do so. With the time-function history scheduling, the performance objectives can be hierarchical and/or any combination of proportional usage and response time in addition to the constant time groups. A specific case of the hierarchy is illustrated in FIG. 2. It should be appreciated that the hierarchy of FIG. 2 is exemplary and is shown merely to describe the inventive features with respect to a particular example. It should not be construed to limit the present invention to the particular scheduling objective(s) illustrated.

In FIG. 2, three (3) job class groups A, B and C are provided. At least some of the job classes in group B (for reasons that will become evident) have subclasses associated therewith as illustrated. Job classes in group A have associated therewith "constant" time-based functions, which leads to a fixed-priority scheme to differentiate among the job classes therein. With constant time-functions, jobs in the second class within the group are scheduled only if there are no jobs in the first class of the group, jobs in the third class within the group are scheduled only if there are no jobs in the first and second class of the group, and so on. Within job class group A, there may be different types of tasks. Thus, for example, there are short "system" tasks that need to be given priority over all other tasks (perhaps with differences in priority among different job classes). These tasks are developed by those building the system in the first instance and thus are "short system tasks" by definition and construction. In addition, there are real-time user (as opposed to system) tasks that are often next in line for access to the resource. Such tasks are often scheduled according to a fixed priority scheme after system tasks are handled but often before other user tasks are handled. Job class group A may further include interactive user tasks, which are defined as a small amount of resource usage between relatively substantial periods of idleness. There may be advantages to giving these interactive tasks absolute priority over other user tasks (which may, therefore, fall into job class group B as will be discussed). The fixed priority scheme provided by constant time-functions can support these (and other) scheduling requirements of different types of tasks with respect of resources of a computer or computer system.

Thus, within the context of job class group A in FIG. 2, there are system tasks with priority over real-time tasks with priority over interactive tasks, all of which are in the same group. The fixed priority scheme (via the constant time-functions) within the group is used to order the access of the resource by the different types of tasks within the group.

A dynamically varying time-based function is preferably associated with each job class in the second group B. In this illustrative example, classes B.1 through B.$L_B$ are subject to a usage mode objective {40%, 20%, . . . 5%}, and the individual classes B.1, B.2, . . . are subject to a response mode objective. Thus, subclasses of B.1 have a response mode objective {10:3: . . . 1} and subclasses of B.2 have a response mode objective {8:4: . . . 1}. The individual parameters of each objective (whether usage or response mode) are, of course, individually selectable and, if desired, dynamically adjustable. Alternatively, such parameters may be pre-assigned at some default value. Adjustment of the parameter values comprising the particular objective may occur upon a given event, upon the expiration of a certain time, through use of an adaptive feedback that adjusts the weights dynamically, through a knowledge-based expert system, or via some other known technique. Thus, for example, one "event" might be temporal-based such as arrival at a particular time of day; alternatively, the event may be load-based such as a trigger that sets a new objective when a given threshold of system usage is reached.

Of course, the fact that usage mode is implemented at the class level and response mode is implemented at the subclass level is merely illustrative. As noted above, neither usage nor response mode is favored in the implementation. Both are equally viable and available for any particular dynamic time-function(s). In general, the per-class time-functions may have any functional form. In the preferred embodiment, the absolute value of each per-class time-function is monotonically non-decreasing (meaning that the time-function value at time "t" is always greater than or equal to the time-function value at time t' for all t' greater than t). This implies that (among other things), job assignment from a given job class that has been provided access to the resource preferably occurs on a first come, first serve basis, as is desirable to provide predictable performance within and across job classes. Any general choice function can then be used to determine which job class within group B should be selected based on the per-class time-function values. Once a particular class is chosen, this procedure of evaluating per-class time-function values and choosing a class based on these values is recursively applied through the appropriate parts of the scheduling hierarchy.

As also seen in FIG. 2, in the representative example, another fixed-priority scheme is used for the job classes in the third group C by assigning a constant time-based function with each class. The set of classes C is (primarily) intended for system-level background work. A non-empty set C can lead to starvation and other system problems if it is not employed carefully and correctly, and thus group C generally is either disabled (by setting its size to 0) or only used by tasks under the sponsorship of other tasks in groups A or B. Groups A and/or C may be empty groups.

FIG. 2 thus illustrates how the scheduling mechanism supports the combination of usage and response modes within or across different hierarchical levels in a very general and flexible manner. For example, a user or the system may select usage mode or response mode. Thus, in a one-level implementation, a system value can be set to switch between either the usage mode or response mode. For a two-level implementation, a system can schedule the resource for classes of requests using usage (or response) mode. Once a certain class is selected to receive the resource next, the selection of a particular subclass within that class can be based on response (or usage) mode. FIG. 2 shows the multi-level implementation with job classes in group B allocated via usage mode, with individual subclasses within a job class allocated via response mode.

A migration mechanism may be associated with each job class. In particular, a job of one class may be migrated to another lower class upon its exceeding a set of criteria based on the job's use of resources. The distance of how far the task is migrated is defined by a migration rate associated with the job class. A class to which a job is initially assigned is the "base class" for the job. Under certain circumstances, a job class (and/or job) may be moved higher up the hierarchy to a higher class. An example of this is set forth below in addressing the problem of "priority inversion."

Preferably, job classes in group B are considered only when there is no ready work in group A, and group C is considered only when there is no ready work in A and B. This hierarchical scheme is used together with the migration mechanism associated with each class, which drops a job to a lower class (within or beyond its current group ) upon exceeding the resource criteria associated with the class. Thus, in one illustrative embodiment, a job enters group B either because its base class is contained in B, or because the job is (eventually) migrated into one of the job classes of group B upon exceeding the migration criteria associated with its group A classes. In this embodiment, jobs enter classes in A and C because their base classes are in A and C, respectively. In addition, preferably a job is returned to its base class upon becoming idle for a substantial period of time.

Figure 3A:
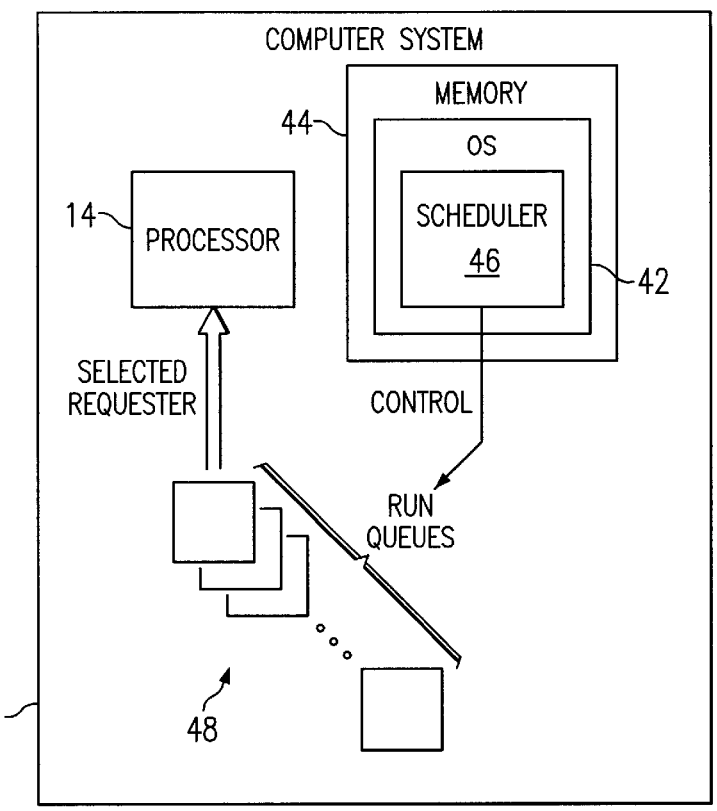
FIG. 3A illustrates the basic operation of the scheduler mechanism of this invention with the mechanism supported within the operating system of a computer.
Figure 3B:
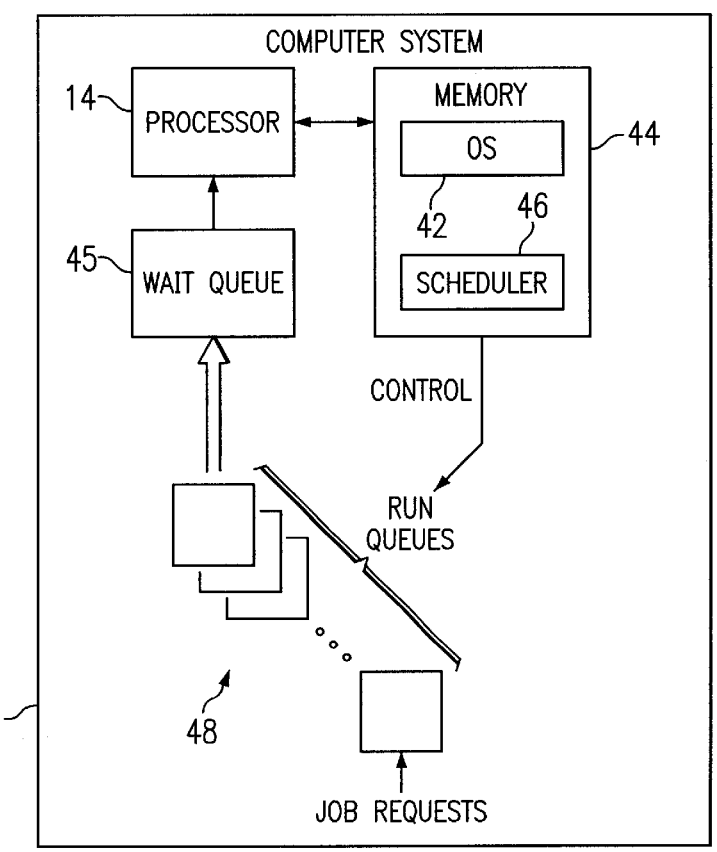
FIG. 3B illustrates the basic operation of the scheduler mechanism when the mechanism is supported as an adjunct to the operating system.

FIGS. 3A and 3B are simplified block diagrams of how the scheduler mechanism operates within a computer or computer system to provide a resource with jobs from the job classes. In this example, resource 14 is the processor or other processing element(s) of the system 40. Computer system 40 includes an operating system 42 supported in memory 44. In the embodiment of FIG. 3A, the scheduler mechanism 46 (sometimes referred to as a dispatcher) is implemented as an operating system utility. In the embodiment of FIG. 3B, the scheduler is a software application executed by the operating system 42. In either case, the scheduler includes a job queue 48 associated with each job class. The basic function of the scheduler mechanism is to obtain jobs from the job queues and provide them to the resource for execution. As illustrated in the FIG. 3B embodiment, the resource may include a wait queue 45 that holds jobs scheduled for execution by the resource. The scheduler mechanism obtains jobs from the job queues and places them in the wait queue for execution by the resource. The wait queue is not required in the FIG. 3A embodiment.

The various operational logic of the scheduling mechanism are now described in the following preferred embodiment. The Group Selection and Class Selection routines (FIGS. 4–5) are used to assign the available resource to a job from an appropriate job class or subclass within a selected group. After a job from a particular class is selected in such manner, the Update routine (FIG. 6) recalculates the dynamic time-function value for the job class in preparation for the next selection cycle. The History Update (FIG. 8) routine calculates the time-function values and maintains necessary data to ensure all the job classes would meet their performance objectives (in contrast to a single job class maneuver in the Update routine). The Job Enter/Return routine (FIG. 7) provide a possible migration mechanism to penalize jobs that use resources beyond the intended limits.

Figure 4:
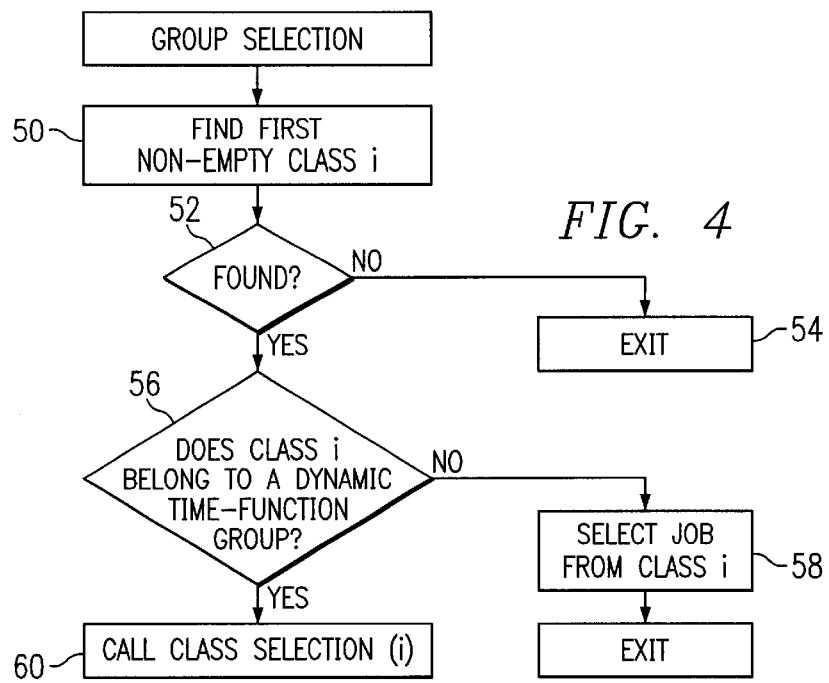
FIG. 4 is a flowchart illustrating a Group Selection routine of the scheduling mechanism.

FIG. 4 is a flowchart illustrating the Group Selection routine. This process is used to select a particular group for processing. It begins at step 50 by finding the first non-empty class in the hierarchy. To this end, the bit mask for the hierarchy is searched and job classes associated with "0" entries in the mask are ignored for processing efficiency. At step 52, a test is performed to determine if a first non-empty class has been found. If not, the routine exits at step 54. If the outcome of the test at step 52 is positive, the routine continues at step 56 to test whether the job class belongs to a group having dynamic time-functions. If not, then the job class belongs to a group having constant time-functions. In the latter case, the routine continues with step 58 to select a job from the class. This is preferably the job within that class which has been waiting the longest to use the resource. The routine then exits. If the outcome of the test at step 56 is positive, the routine continues at step 60 to call a Class Selection routine.

Figure 5:
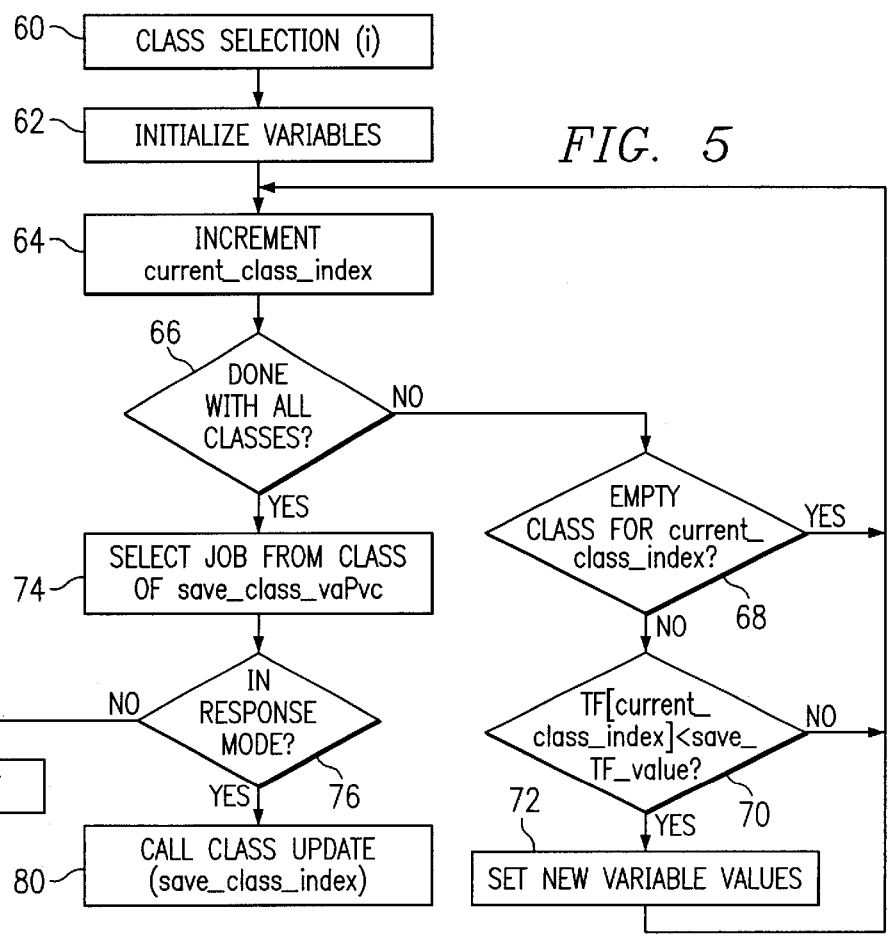
FIG. 5 is a flowchart illustrating a Class Selection routine.

The Class Selection routine is illustrated in the flowchart of FIG. 5. This routine is recursively applied to the hierarchy as needed for the dynamic time-function groups. Since the time-function values for each job class or subclass change over time and at different proportional ratios, the Class Selection routine compares all the time-function values of all non-empty classes within a group before making the selection. It begins at step 62 by initializing temporary variables: "save_TF_value" (to value TF[I]), "save_class_index" (to value I) and current_class_index (to value I). At step 64, the current_class_index is incremented. The routine then continues at step 66 to test whether all classes have been evaluated. If not, a test is performed at step 68 to determine if the class for the current_class_index is empty (which, as noted above, can be done using the bit mask). If the outcome of the test at step 68 is positive, the routine cycles back to step 64 and increments the current_class_index. If the outcome of the test at step 68 is negative, however, a test is performed at step 70 to determine whether TF[current_classindex] is less than save_TF_value. If the outcome of the test at step 70 is negative, the routine cycles back to step 64 and the current_class_index is incremented. If, however, the outcome of the test at step 70 is positive, the routine continues at step 72 and sets save_TF_value=TF[current_class_index] and save_class_index=current_class_index and then returns to step 64. Alternatively, if the outcome of the test at step 66 is positive, indicating that all classes have been checked, the routine branches to step 74 to select a job from the job class of save_class_index. At step 76, a test is then performed to determine if the job class selected is associated with response mode objectives. If not, the routine exits at step 78. If, however, the job class is associated with response mode, a Class Update routine is called at step 80.

The Class Update routine is illustrated in FIG. 6. This routine "prepares" a next job in the class to be selected during a next iteration. In the context of usage mode, step 80 is reached after adding the resource usage (from the job that just finished executing) to a cumulative usage for the job. Turning to the flowchart, the routine begins at step 82 by testing whether the class at issue is in usage mode. If so, the routine continues at step 84 to update cumulative usage by last class i resource usage and setting TF[i] to a new value using the following (equation (1)):

time-function-value=function (cumulative usage, weight)

where the weight for the job class is a parameter value in the particular usage time objective. The above function ensures that each job class will obtain its appropriate shares of resource usage while the usage accumulations grow at different rates. After step 84, the routine ends. If the outcome of the test at step 82 is negative, however, the routine continues at step 88 to set TF[I] using the following equation (2) for the next job on the run queue for class i:

time-function-value=function (waiting time, weight)

where the waiting time reflects how long the job class has been waiting for the resource and the weight for the job class is a parameter determined by the response time objective. After step 88, the routine exits.

FIG. 7 illustrates a Job Enter/Return routine that is used to place a particular job in a job queue initially or following its execution by the resource. The routine begins at step 90 to determine if the job of class_index has been idle longer than some pre-defined idle_limit. If so, class_index is set equal to base_class in step 92. The job is then placed on the job queue of class_index at step 94 and the routine ends. If the outcome of the test at step 90 is negative, the routine continues by testing at step 96 to determine whether job cumulative resource usage is greater than a limit that is set for jobs in the class. If not, the routine branches to step 94. If, however, the outcome of the test at step 96 is positive, the routine continues at step 98 and sets class_index equal to a target migration class. The routine then continues with step 94 as previously described. Steps 92 and 98 thus implement job migration across the hierarchy.

FIG. 8 illustrates a History Update routine that will recalculate the time-function values for each job class that has a dynamic time-function. This routine begins at step 100. At step 102, a test is made to determine whether class i is associated with usage mode. If so, the routine continues at step 104 to apply an aging function (if necessary) to the cumulative usage for class i. The routine then exits. An example for the aging scheme is multiplying TF[i] by a constant (less than 1). The aging function provides several advantages. If a class of jobs has not been using the resource for some period of time (e.g., the last 24 hours), it might monopolize the resource in order to make up for "lost" time. The aging function prevents such biasing.

Alternatively, if the outcome of the test at step 102 is negative, then response mode is in effect. Then, the routine continues at step 106, updating TF[i] using equation (2) described above and the routine ends. At the end of this routine, all the job classes in the response mode will have their time-function values recalculated with respect to a new scheduling epoch (thus, with new waiting time). The History Update routine can be used at every selection cycle. However, this routine is used at a fixed time interval, which is user/system definable. For efficiency reasons, the latter approach is preferred.

It should be appreciated that equation (1) is thus executed when the scheduler operates in usage mode (to allocate according to a usage time objective) and that equation (2) is executed when the scheduler operates in response mode (to allocate according to a response objective). Within any particular level (whether class, subclass, sub-subclass, etc.), preferably only one type of mode (either response or usage) is implemented. In usage mode, the time-function value for each class is preferably determined by the accumulated usage by all the jobs in the class. In response mode, the time-function value is preferably determined by the waiting time of the oldest job in the class. It should be noted that the use of the "oldest" job follows directly from the use of monotonically non-decreasing response mode time-functions. If the time-functions were not non-decreasing, then the time-function value for each class could be based on the highest time-function value after evaluating all jobs in the class. All such variations are within the scope of the present invention.

It should be appreciated that, in usage mode, all time-function values are positive and are moving "forward" in time. The scheduler mechanism thus checks for "minimum" values to meet the given utilization objective. Each time the resource is used, the job class gets "charged" for it and jobs move forward along the given time-function value curve. In response mode, time-function values increase with time and scheduling is typically based on selecting "maximum" values (i.e. highest time-function value jobs). For purposes of a unified methodology, the present invention processes the response mode time-function value curve with "negative" weight (as will be seen below) such that, in effect, "minimum" values are selected just as they are during usage mode. This presents a "unified" method and processing scheme irrespective of whether usage or response mode is involved.

Thus, in usage mode, the scheduler checks for the minimum value which identifies the class that is furthest away from its proportional utilization objective relative to the other classes at the time. In response mode, the scheduler checks for the largest time-function value among all jobs in the group; however, given non-decreasing functions, this simplifies to finding the largest time-function value among the oldest job in each class.

The following describes representative examples of scheduling under usage-mode time-functions and response-mode time-functions to illustrate these concepts. Consider the case where a pair of job classes A:B (or subclasses, or sub-subclasses, etc.) are scheduled according to a usage-mode objective of $\{80:20\}$, i.e class A is to receive 80% of the resource and class B is to receive 20% of the resource over a particular interval when both jobs are present. With this objective, a representative "weight" for the usage-mode time-function of class A (as described above with respect to equation (1)) is $\{1/8\}$ or $\{1/4\}$ corresponding to a representative "weight" for the class B usage-mode time-function of $\{1/2\}$ or $\{1\}$. For the purposes of this simple example, assume the cumulative usage for both classes is initially 0, the job queue for both classes contains many jobs, and the processing requirements of all jobs is 1 unit. According to the preferred operation of the invention, the job class with the "minimum" time-function value is always selected whenever a scheduling decision is made. Thus, when the resource becomes available, the scheduler will select the first job from class A for processing, since higher classes are preferably chosen to arbitrate ties. Upon completion, the time-function value for class A will be updated to ¼ (i.e 0 plus 1 unit multiplied by ¼). The next scheduling decision will select the first job from class B for processing, since class B's time-function value is 0. Upon completion of this job, the time-function value for class B will be updated to 1 (i.e 0 plus 1 unit multiplied by 1). Continuing in this manner, the next four scheduling decisions will select a job from class A (since ties are won by class A), resulting in a time-function value of 1.25 (0.25 plus 4 units multiplied by ¼) for class A. The next scheduling decision will select a job from class B, resulting in a time-function value of 2 (1 plus 1 unit multiplied by 1). This continues as long as there are jobs in the job queue of both classes, subject to history updates. A graph of this operation is shown in FIG. 9A.

Figure 9B:
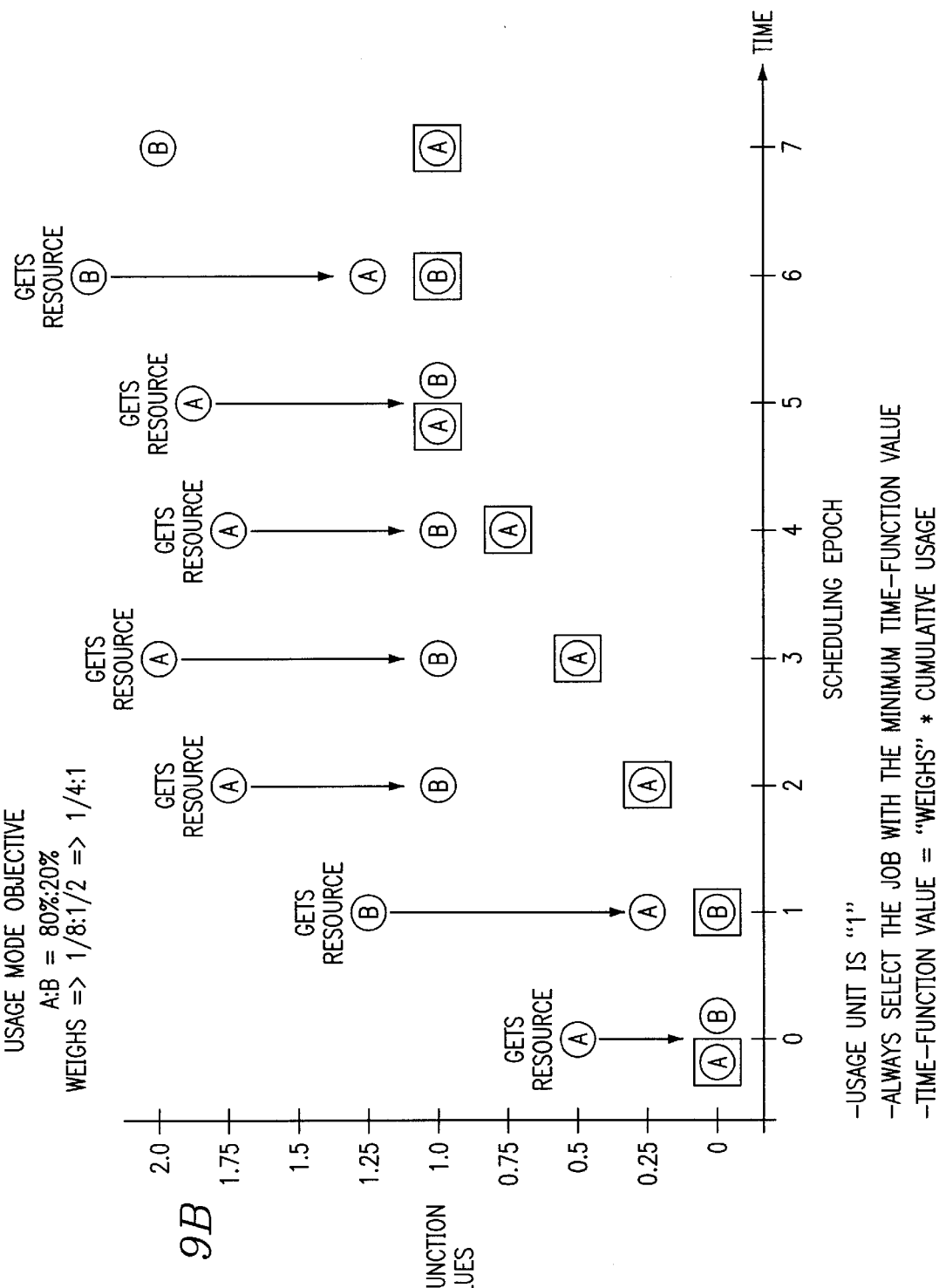

For a representative example of scheduling under response-mode time-functions, consider the case where three job classes A:B:C (or subclasses, or sub-subclasses, etc.) are scheduled according to per-class time-functions that vary linearly with the amount of time a job in the class spends waiting for the resource under a response-mode objective of $\{4:2:1\}$, i.e the per-class time-function for a job is simply the "weight" for its class multiplied by the amount of time it has spent waiting in the job queue. For the purposes of this simple example, assume that each job class has a single job which immediately returns to its job queue after receiving 1 unit of processing, and the waiting time of all jobs is initially 0. To be consistent with the minimum operator as the choice function, we consider the weights $\{-4:-2:-1\}$ for the classes A:B:C for the purposes of this simple example. Since the time-function values are initially all 0 (due to 0 waiting times), the scheduler will first select the job from class A for processing, since higher classes are preferably chosen in the case of ties. Upon completion at time 1, the time-function values for classes A, B and C are equal to 0, −2 and −1, respectively. Since the class 2 time-function value is now smallest, this results in the selection of the class B job, and upon its completion at time 2, the time-function values for classes A, B and C are equal to −4, 0 and −2, respectively. The job in class A is then selected, and upon its completion at time 3, the per-class time-function values are 0, −2, −3. This causes the job in class 3 to be selected next, yielding time-function values of −4, −4 and 0 when it completes at time 4. The operation of the scheduler continues in this manner for this simple example. A graph of this operation is shown in FIG. 9B.

In the preferred embodiment, the proportional time-function values (namely, the usage or response mode objective parameters) for the job classes are adjustable. Thus, for example, the vector of values is adjusted using an adaptive feedback mechanism that "adapts" the values to changing conditions. A "default" set of values would then be run when total system utilization was at a given value (e.g., 100%); when the total system utilization was reduced to a second value (e.g., 75%, a new set of values would be run, and so on. Alternatively, the values for the job classes may be changed upon the occurrence of a particular event or time of day, or these values may be optimized or otherwise adjusted according to a knowledge base using an expert system. Yet another alternative is to modify the values upon a given mix of jobs. Again, all such variations are within the scope of the present invention.

As previously noted, the present invention implements other adaptive feedback mechanisms besides adaptively adjusting the time-functions (or time-function parameters) with changes in the utilization, the mix of jobs, etc. Thus, the migration of jobs from one class to another in the hierarchy as resource usage exceeds limits specified by the system administrator and/or user, is another such mechanism. Another such feedback mechanism involves returning to the job's base class upon not using the resource for some pre-specified period of time. Another adaptive feedback mechanism addresses the problem of "priority inversion."

In particular, priority inversion is the situation where a high time-function value requester is blocked from using the current resource because it is also a requester for another highly-contented resource that is held by a low time-function value requester. This can be a serious problem as the low value requester prevents the high time-function requester from meeting its performance objective. This problem is solved using the inventive framework by allowing the low time-function requester to be placed in the class of the high time-function value for the duration of holding the other highly contented resource, after which the low time-function requester is returned to its original job class. This is an adaptive feedback mechanism.

As a concrete example of this mechanism, assume that there are two resources, a CPU and a logical lock. The use of CPU is scheduled using the time-function scheme. Job A is in a job class with a higher proportional usage than job B's class. It is assumed job B holds the lock but its time-function value is low in comparison to many other jobs in the system. Job A has a time-function that entitles it to have the CPU much earlier than job B, but job A is blocked from using the CPU because of the lock held by job B. According to the present invention, job B inherits the time-function of job A's class for accessing the CPU until job B releases the lock and makes it available to job A. Job B is then returned to the job class it was in before it was bumped up to the other class. Known scheduling mechanisms do not have the capability of solving the priority inversion problem in this unique way.

The scheduler of the invention is preferably run on a computer, such as an IBM RISC System/6000 computer (a reduced instruction set of so-called RISC-based workstation) running the AIX Operating System (Advanced interactive Executive Version 4.1 and above), or an Intel-based processor system running the Windows NT or OS/2® operating system. The computer includes a graphical user interface (GUI) for management and administration. The various models of the RISC-based computers are described in many publications of the IBM Corporation, for example, RISC System/6000, 7013 and 7016 POWERstation and POWERserver Hardware Technical Reference, Order No. SA23-2644-00. AIX OS is described in AIX Operating System Technical Reference, published by IBM Corporation, First Edition (November 1985), and other publications. While the above platform is useful, any other suitable hardware/operating system combinations may be used. Thus, for example, suitable alternative machines include: an IBM-compatible PC 486 or higher running Novell UnixWare 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3.

One of the preferred implementations of the invention is an operating system utility, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While the term "resource" has been used herein in relation to a processor, it should be appreciated that this term should be broadly construed to cover any physical or logical device or component (whether hardware or software, or some combination thereof) of a computer or computer system that has some bounded capacity consumable at some given rate. Thus, a "resource" as used herein may refer, for example, to a processor (which operates at n cycles per second), a memory (whose storage may be reclaimed at n bits per second), a communications link (whose capacity may be allocated as a function of size and time), a database, a lock, etc. Moreover, one of ordinary skill in the art will appreciate that the invention may be practiced in any type of computer system environment including a uniprocessor system, a system having a group of tightly-coupled processors, or in a networked environment with a loose cluster of computers. Moreover, the term "job" is not intended to limit the invention to any particular operating system or environment. A "job" is analogous or equivalent to a task, a process, an execution thread, a requester or, in general, any "unit" or work that consumes a resource.

The present invention provides significant advantages over the prior art. Known resource scheduling mechanisms do not provide an integrated framework under which both usage and response mode scheduling may be implemented. Even with respect to the respective modes, such known schemes do not provide for the level of control available by the dynamic time-based functional approach described above. In addition, the present invention advantageously exploits the concept of a job class "hierarchy" wherein at one level, job classes are physically partitioned into groups having absolute priority over each other and, at another level, individual classes are logically partitioned into a recursive array of subclasses. Likewise, subclasses may be logically partitioned to an even finer extent. As above, adaptive feedback mechanisms may be used to modify time function values up and down the hierarchy in a dynamic manner.

These and other features of the present invention enable the integrated methodology of this invention to address and solve known scheduling problems within a new framework. As an example, one such problem is known as "priority inversion."

Summarizing, the present invention provides both pro-rated resource utilization (usage mode) and pro-rated resource response time (response mode) within a single framework. The scheduling mechanism advantageously provides pro-rated resource response time within categories of pro-rated resource utilization, or pro-rated resource utilization within categories of pro-rated resource response time. Thus, for example, in the case of usage mode, multiple categories of work are allowed resource usage time in ratios specified by the user or the system, such as different percentages for which the total equals 100 percent. Unused cycles to which a category is entitled are allocated in proportion to the ratios specified by the user. In the case of response mode, multiple categories of work are provided resource response delays to achieve a general objective function specified by the user or the system, such as minimizing a weighted sum of a function of the per-class response times or achieving mean response delays in predefined ratios. Unused cycles to which a category is entitled are allocated in proportion to the ratios specified by the user.

The scheduling mechanism of the present invention makes it possible to control effectively the allocation of resources in a general, flexible and adaptive manner. In addition, various mechanisms are used to dynamically adjust the per-class time-functions in response to changes in the system workload so that the desired user or system objectives are continuously satisfied. Similarly, diverse sets of time-functions are employed during different periods of system operation to achieve the desired scheduling objectives over the corresponding time intervals.

Having thus described our invention, what we claim as new and desire to secure by letters patent is set forth in the following claims.

What is claimed is:

1. A method of scheduling jobs to be executed by a resource in a computer system, comprising the steps of:
    organizing the jobs into a hierarchy comprising groups of job classes, wherein at least one group of job classes includes at least one job class having a set of subclasses associated therewith;
    proportionally allocating the resource to the hierarchy according to a usage objective;
    proportionally allocating the resource to the hierarchy according to a response objective; and
    scheduling job classes for execution to satisfy an objective selected from the group of objectives consisting of the usage objective, the response time objective and a combination of the usage and response time objectives.

2. The method as described in claim 1 wherein the usage objective proportionally allocates the resource to job classes within a given group.

3. The method as described in claim 2 wherein the response objective proportionally allocates the resource to subclasses within a particular job class of the job classes with the given group.

4. The method as described in claim 1 wherein the response objective proportionally allocates the resource to job classes within a given group.

5. The method as described in claim 4 wherein the usage objective proportionally allocates the resource to subclasses within a particular job class of the job classes with the given group.

6. The method as described in claim 1 wherein at least a first group of job classes has a higher priority than a second group of job classes.

7. The method as described in claim 6 wherein the first group of job classes comprises job classes comprising short system tasks, interactive tasks and jobs with real-time constraints.

8. The method as described in claim 7 wherein each of the job classes in the first group is associated with a constant time-function.

9. The method as described in claim 7 wherein each of the job classes in the second group of job classes is associated with a dynamic time-function.

10. The method as described in claim 1 further including the step of modifying the response time objective.

11. The method as described in claim 10 wherein the response time objective is modified by adaptively adjusting time-function values associated with one or more job classes.

12. The method as described in claim 1 further including the step of modifying the usage time objective.

13. The method as described in claim 12 wherein the usage time objective is modified by adaptively adjusting time-function values associated with one or more job classes.

14. The method as described in claim 1 further including the step of migrating a job between job classes of a group.

15. The method as described in claim 14 further including the step of returning the job to an originating job class if the job does not access the resource within a given time.

16. A method of scheduling jobs to be executed by a processor in a computer system, comprising the steps of:
    organizing the jobs into a hierarchy comprising job classes, wherein at least one job class has a set of subclasses associated therewith;
    proportionally allocating the processor to the hierarchy according to a usage objective;
    proportionally allocating the processor to the hierarchy according to a response objective; and
    scheduling job classes for execution to satisfy an objective selected from the group of objectives consisting of the usage objective, the response time objective and a combination of the usage and response time objectives.

17. The method as described in claim 16 wherein the usage objective proportionally allocates the processor to the job classes.

18. The method as described in claim 17 wherein the response objective proportionally allocates the processor to subclasses within a particular job class.

19. The method as described in claim 16 wherein the response objective proportionally allocates the processor to the job classes.

20. The method as described in claim 19 wherein the usage objective proportionally allocates the processor to subclasses within a particular job class.

21. The method as described in claim 16 further including the step of dynamically adjusting the response objective.

22. The method as described in claim 16 further including the step of dynamically adjusting the usage objective.

23. The method as described in claim 16 further including the step of selectively migrating a job between job classes.

24. The method as described in claim 23 further including the step of selectively returning the job back to an originating job class if the job does not access the resource within a given time.

25. A computer, comprising:
    processor,
    an operating system, and
    a scheduler run by the operating system for scheduling jobs to be executed by the processor, the scheduler comprising:
        means for organizing the jobs into a hierarchy comprising job classes, wherein at least one group of job classes includes at least one job class having a set of subclasses associated therewith;
        means for proportionally allocating the processor to the hierarchy according to a usage objective;
        means for proportionally allocating the processor to the hierarchy according to a response objective; and
        means for scheduling jobs for execution to satisfy the usage and response time objectives.

26. A computer program product in a computer-readable medium, comprising:
    means for organizing the jobs into a hierarchy comprising job classes, wherein at least one group of job classes includes at least one job class having a set of subclasses associated therewith;

means for proportionally allocating the processor to the hierarchy according to a usage objective;

means for proportionally allocating the processor to the hierarchy according to a response objective; and means for scheduling jobs for execution to satisfy the usage and response time objectives.

27. A method of scheduling jobs to be executed by a resource in a computer system, comprising the steps of:

proportionally allocating the resource to a set of job classes according to a response mode objective, wherein each of the job classes has associated therewith a monotonically non-increasing time-function value; and scheduling job classes for execution to satisfy the response mode objective.

28. The method as described in claim 27 wherein the time-function value for each job class is determined by a waiting time of an oldest job in the job class and the job classes are scheduled at each scheduling epoch by selecting a given job class having a minimum time-function value.

29. A method of scheduling jobs to be executed by a resource in a computer system, comprising the steps of:

proportionally allocating the resource to a set of job classes according to a usage mode objective, wherein each of the job classes has associated therewith a monotonically non-decreasing time-function value; and scheduling job classes for execution to satisfy the usage mode objective.

30. The method as described in claim 29 wherein the time-function value for each job class is determined by an accumulated usage by all the jobs in the job class and the job classes are scheduled at each scheduling epoch by selected a given job class having a minimum time-function value.

31. A method of scheduling jobs to be executed by a resource in a computer system, comprising the steps of:

proportionally allocating the resource to a set of job classes according to a response mode objective, wherein each of the job classes has associated therewith a monotonically non-increasing time-function value;

proportionally allocating the resource to a set of job classes according to a usage mode objective, wherein each of the job classes has associated therewith a monotonically non-decreasing time-function value; and scheduling job classes for execution to satisfy the response mode objective, the usage mode objection, or a combination of the response mode and usage mode objectives.

32. The method as described in claim 31 wherein the time-function value for each job class associated with the response mode objective is determined by a waiting time of an oldest job in the job class and the job classes are scheduled at each scheduling epoch by selected a given job class having a minimum time-function value.

33. The method as described in claim 31 wherein the time-function value for each job class associated with the usage mode objective is determined by an accumulated usage by all the jobs in the job class and the job classes are scheduled at each scheduling epoch by selected a given job class having a minimum time-function value.

\* \* \* \* \*